United States Patent
Holmes et al.

(10) Patent No.: US 12,460,736 B2
(45) Date of Patent: Nov. 4, 2025

(54) SMART DAMPING CONTROL VALVE

(71) Applicant: Solero Technologies, LLC, Water Valley, MS (US)

(72) Inventors: Garrett Holmes, Water Valley, MS (US); Chandreshwar Rao, Water Valley, MS (US); Brett Peglowski, Water Valley, MS (US)

(73) Assignee: Solero Technologies, LLC, Water Valley, MS (US)

( * ) Notice: Subject to any disclaimer, the term of this patent is extended or adjusted under 35 U.S.C. 154(b) by 45 days.

(21) Appl. No.: 18/402,127

(22) Filed: Jan. 2, 2024

(65) Prior Publication Data

US 2025/0215994 A1 Jul. 3, 2025

(51) Int. Cl.
*F16K 31/06* (2006.01)
*F16K 47/00* (2006.01)
*F16K 17/08* (2006.01)
*F16K 27/02* (2006.01)

(52) U.S. Cl.
CPC ...... *F16K 31/0675* (2013.01); *F16K 31/0651* (2013.01); *F16K 47/0111* (2021.08); *F16K 17/08* (2013.01); *F16K 27/029* (2013.01); *F16K 2200/204* (2021.08); *F16K 2200/302* (2021.08)

(58) Field of Classification Search
USPC ...... 137/512.2, 628–603.15, 625.35, 625.68; 188/282.2–282.4, 282.8, 282.9
See application file for complete search history.

(56) References Cited

U.S. PATENT DOCUMENTS

| | | | | |
|---|---|---|---|---|
| 4,821,851 A * | 4/1989 | Kruckemeier | .......... | F16F 9/468 188/282.4 |
| 5,064,032 A * | 11/1991 | Ashiba | ..................... | F16F 9/466 188/282.4 |
| 5,205,385 A * | 4/1993 | Ashiba | ....................... | F16F 9/46 188/266.5 |
| 5,518,089 A * | 5/1996 | Handke | .................... | F16F 9/465 188/315 |
| 5,606,992 A * | 3/1997 | Erickson | ............. | F16K 31/0675 251/129.21 |
| 6,206,487 B1 * | 3/2001 | Nakamura | ............ | B60T 13/683 303/118.1 |
| 6,460,663 B1 * | 10/2002 | Huang | ................... | F16F 9/3214 188/266.5 |

(Continued)

*Primary Examiner* — Matthew W Jellett
(74) *Attorney, Agent, or Firm* — WARNER NORCROSS + JUDD LLP

(57) ABSTRACT

A smart damping control valve having a failsafe mode is provided. The control valve includes a movable valve assembly within a valve housing. The moveable valve assembly includes a shuttle valve concentrically positioned with respect to a spool valve, with the spool valve and the shuttle valve each being axially moveable within a bore in the valve housing. The control valve includes a solenoid assembly having an electromagnetically actuated armature that varies the opening pressure of the movable valve assembly. At a first electrical current, the valve assembly provides a first opening pressure, and at a second electrical current, the valve assembly provides a second opening pressure. The valve assembly provides a third opening pressure, between the first and second opening pressures, in the absence of an electrical current to the solenoid assembly.

19 Claims, 8 Drawing Sheets

(56) References Cited

U.S. PATENT DOCUMENTS

| | | | | |
|---|---|---|---|---|
| 6,612,338 | B2* | 9/2003 | Weldon | F16K 3/265 |
| | | | | 137/589 |
| 7,841,360 | B2* | 11/2010 | Bruck | F16K 17/22 |
| | | | | 137/625.68 |
| 7,878,311 | B2 | 2/2011 | Van Weelden et al. | |
| 8,413,685 | B2* | 4/2013 | Okamoto | F16K 31/0634 |
| | | | | 137/625.69 |
| 8,622,088 | B2* | 1/2014 | Sugiura | F16K 31/04 |
| | | | | 137/630.15 |
| 9,261,162 | B2* | 2/2016 | Jee | F16F 9/464 |
| 9,506,520 | B2* | 11/2016 | Kim | F16F 9/512 |
| 9,551,997 | B2 | 1/2017 | Bergfeld et al. | |
| 9,599,245 | B2* | 3/2017 | Holmes | F15B 13/0402 |
| 9,809,078 | B2 | 11/2017 | Tucker et al. | |
| 10,527,120 | B2 | 1/2020 | Bahr et al. | |
| 10,655,701 | B2 | 5/2020 | Manger et al. | |
| 10,962,081 | B2 | 3/2021 | Sankaran et al. | |
| 11,215,292 | B2 | 1/2022 | Bahr et al. | |
| 11,692,606 | B2 | 7/2023 | Manger et al. | |
| 2008/0004770 | A1 | 1/2008 | Masamura | |
| 2010/0006383 | A1* | 1/2010 | Jee | F16F 9/325 |
| | | | | 188/322.15 |
| 2017/0074417 | A1 | 3/2017 | Okawara | |
| 2020/0362934 | A1 | 11/2020 | Knezevic et al. | |

\* cited by examiner

SMART DAMPING CONTROL VALVE

FIELD OF THE INVENTION

The present disclosure relates to a smart damping control valve for a vehicle shock absorber and/or a vehicle suspension system, the smart damping control valve having a failsafe mode of operation.

BACKGROUND OF THE INVENTION

Smart damping control valves have seen significant advancements over the past few decades. These valves are used in suspension systems to reduce the impact of surface irregularities and to provide a smoother and more comfortable ride. The primary function of damping control valves is to control the flow of hydraulic fluid through a shock absorber, thereby controlling the amplitude and frequency of the vibrations experienced by the vehicle.

Recently, there has been a growing interest in electromagnetically-actuated shock absorber damping control valves. These valves offer numerous advantages over traditional hydraulic valves, including faster response times, more precise control, and the ability to control the damping force in real-time by controlling electrical current through a solenoid coil. Additionally, these valves rely less heavily on mechanical components, which can wear out over time, leading to decreased performance and increased maintenance costs.

Despite recent advancements in electromagnetically-actuated damping control valves, there remains room for improvement in this field. In particular, there remains a continued need for an improved damping control valve having a failsafe mode in which a predetermined damping force is provided in the absence of an electrical control signal to the control valve.

SUMMARY OF THE INVENTION

A smart damping control valve having a failsafe mode is provided. The control valve includes a movable valve assembly within a valve housing. The moveable valve assembly includes a shuttle valve concentrically received with respect to a spool valve, with the spool valve and the shuttle valve each being axially moveable within a bore in the valve housing. The control valve includes a solenoid assembly having an electromagnetically actuated armature that varies the opening pressure of the movable valve assembly. At a first electrical current, the valve assembly provides a first opening pressure, and at a second electrical current, the valve assembly provides a second opening pressure. The valve assembly provides a third opening pressure, between the first and second opening pressures, in the absence of an electrical current to the solenoid assembly.

In one embodiment, the valve housing includes an inlet and an outlet connected by a fluid passage. The valve assembly further includes a shuttle valve concentrically received with a spool valve. The spool valve and the shuttle valve are axially displaceable within the valve housing in response to fluid pressure at the valve inlet. The opening pressure of the valve assembly is controlled in response to actuation of the solenoid, which is operatively coupled to the shuttle valve by a solenoid armature and plunger. The control valve provides a fail-safe opening pressure at failure, the fail-safe opening pressure being between a maximum opening pressure at a maximum solenoid current and a minimum opening pressure at a minimum solenoid current.

These and other features of the invention will be more fully understood and appreciated by reference to the description of the embodiments and the drawings.

DETAILED DESCRIPTION OF THE CURRENT EMBODIMENT

Figure 1:
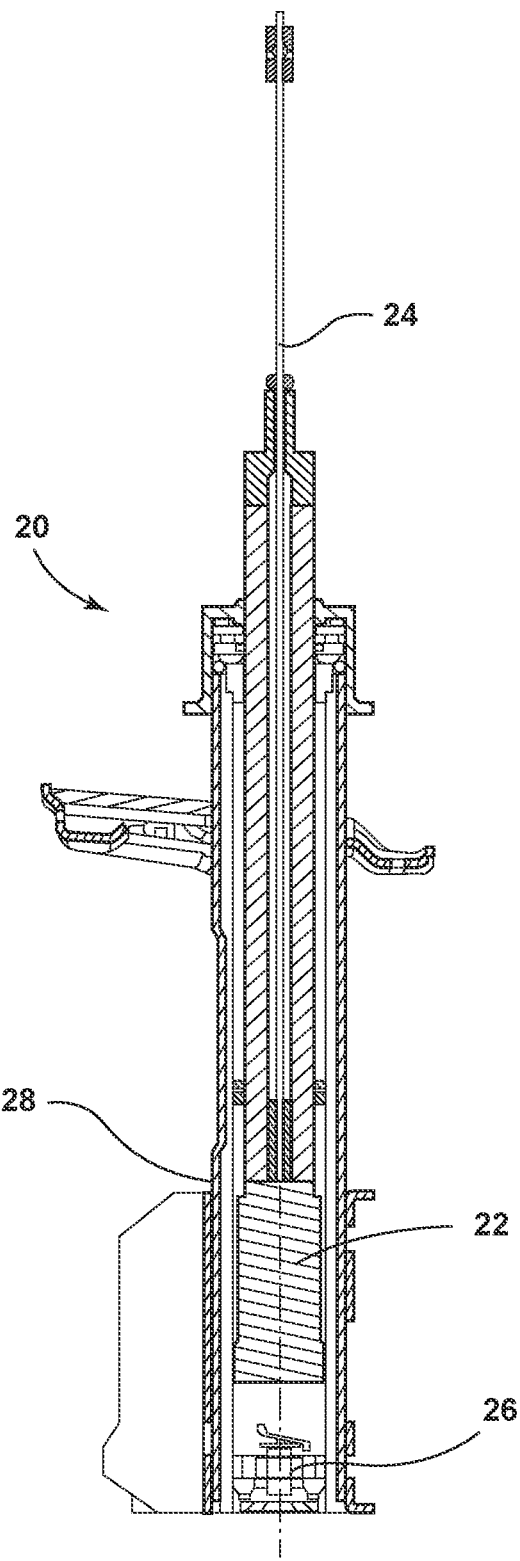
FIG. 1 is a cross-sectional view of a shock absorber including an internally-mounted smart damping control valve in accordance with one embodiment.
Figure 2:
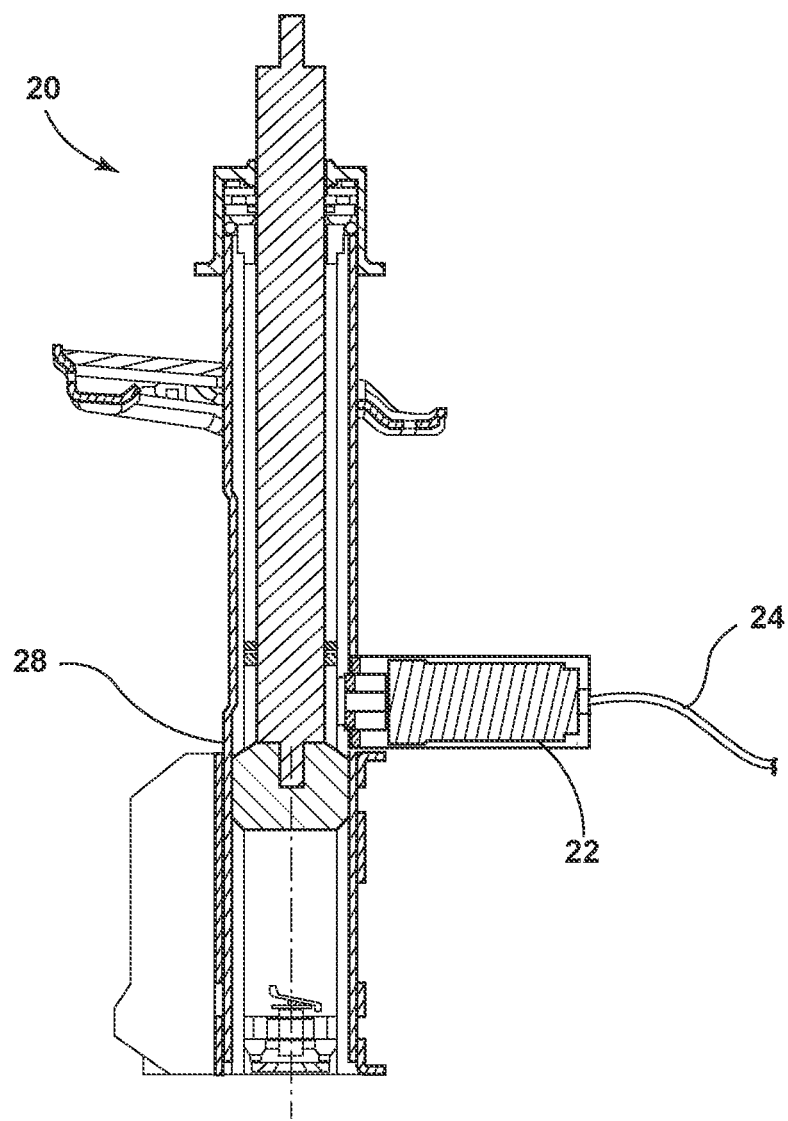
FIG. 2 is a cross-sectional view of a shock absorber including an externally-mounted control valve in accordance with one embodiment.

As discussed herein, the current embodiment generally relates to a smart damping control valve 22 for proportional damping of a shock absorber 20 or a vehicle suspension system. By non-limiting example, an internally-mounted shock absorber 20 is depicted in cross-section in FIG. 1 and includes the smart damping control valve 22, an electrical cable 24 leading to the control valve 22, and a base valve 26. At least a portion of the electrical cable 24, the control valve 22, and the base valve 26 are disposed within a shock absorber housing 28. Also by non-limiting example, an externally-mounted shock absorber 20 is depicted in cross-section in FIG. 2. In both examples, the electrical cable 24 is connected to a power supply (not shown) for providing an electrical current to an electromagnetic actuator, for example a solenoid. In alternative embodiments, the control valve 22 may be actuated by hydraulic actuator.

Figure 3:
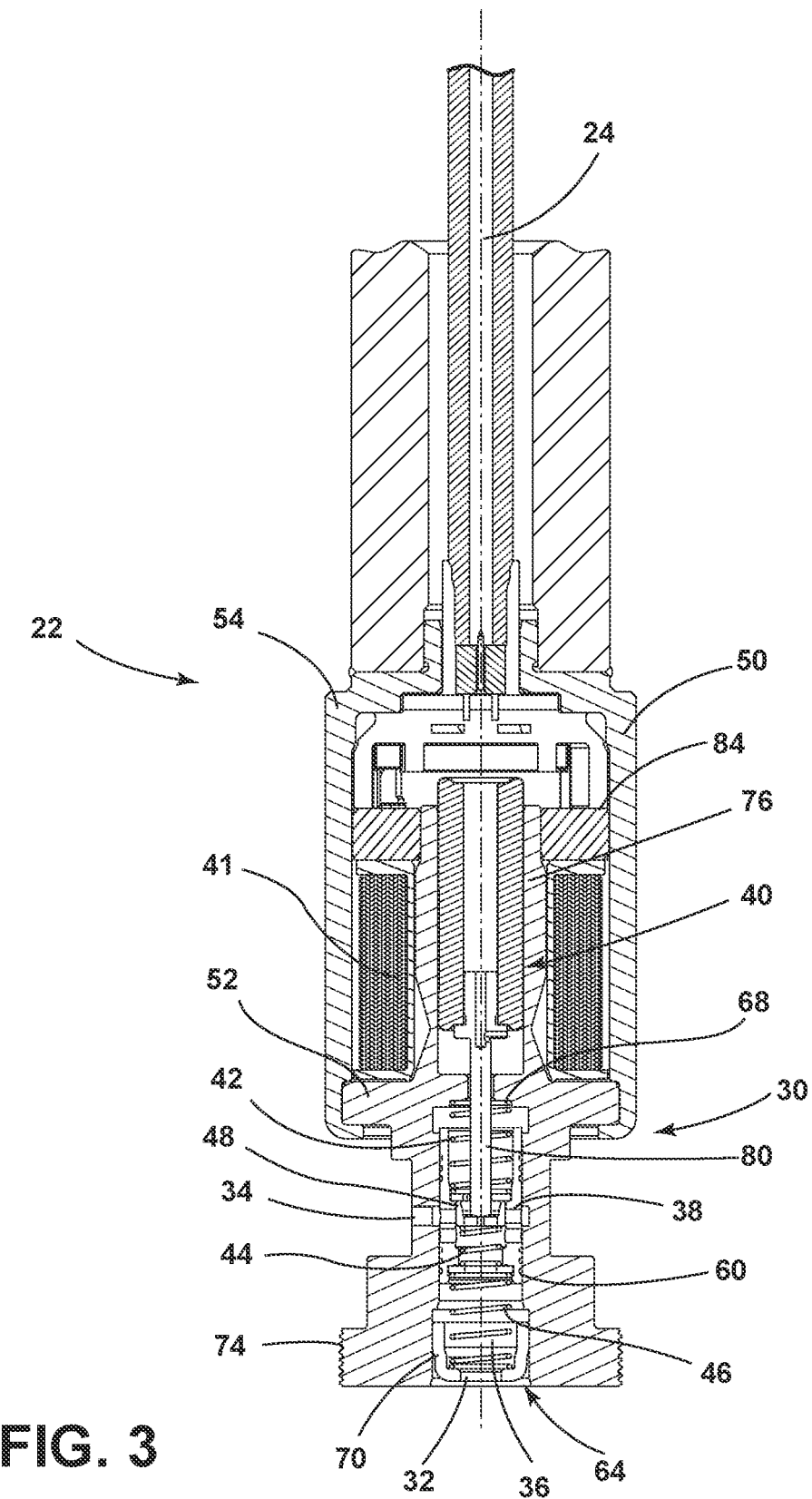
FIG. 3 is a cross-sectional close-up view of the smart damping control valve depicted in FIGS. 1-2.

As more specifically shown in FIG. 3, the smart damping control valve 22 includes a valve housing 30 having an axial inlet 32 and a radial outlet 34. The axial inlet 32 and the radial outlet 34 are interconnected via a fluid passage 36. A spool valve 38 is axially displaceable within the fluid passage 36 for regulating volumetric flow through the control valve 22. The control valve 22 also includes a magnetic armature 40 and a solenoid winding 41, the magnetic armature 40 being axially displaceable. The control valve 22 further includes a first spring 42, a second spring 44, and a third spring 46 seated within the valve housing 30, with each spring being a helical compression spring. A shuttle valve 48 is concentrically received with respect to the spool valve 38. The spool valve 38 includes a first outer diameter along an upper portion 43 and a second outer diameter along a lower portion 45, the second outer diameter being slightly larger than the first outer diameter (e.g., on the order of a millimeter or more), or vice versa. The spool valve 38 also includes a first inner diameter along a first portion thereof and includes a second inner diameter along a second portion thereof. The first inner diameter is less than the second inner diameter, and the shuttle valve 48 is movable along this first portion of the spool valve (having the smaller inner diameter) in response to actuation of the magnetic armature 40. As discussed below, the control valve 22 provides a fail-safe opening pressure at zero current between a maximum opening pressure at a maximum solenoid current and a minimum opening pressure at a minimum solenoid current.

Figure 4:
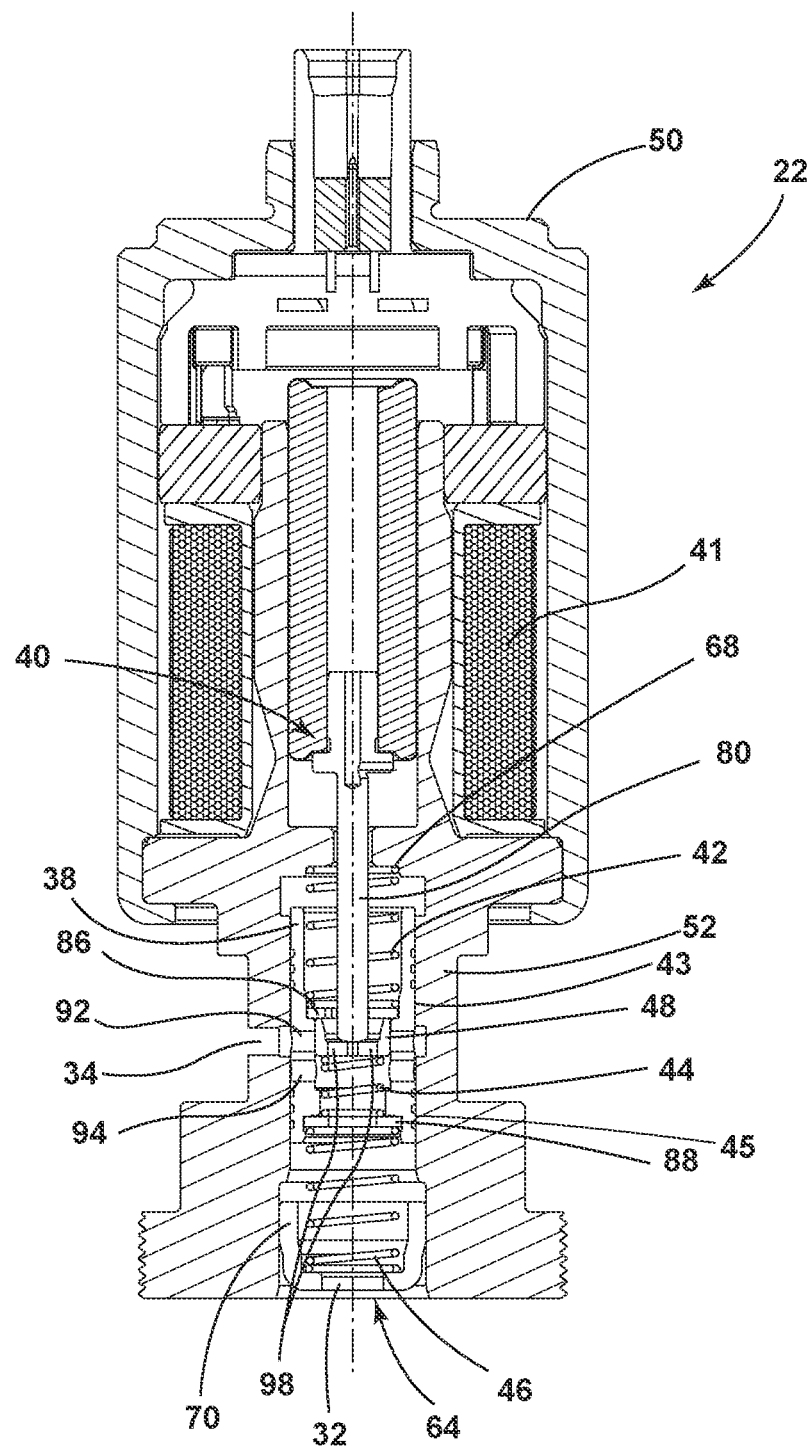
FIG. 4 is a cross-sectional view of the smart damping control valve in a closed fail-safe position.

Further with respect to FIGS. 3-4, the valve housing 30 comprises a solenoid housing 50 and a valve body 52. The solenoid housing 50 includes a cylindrical sidewall 54, and the valve body 52 defines a central bore 60. The fluid passage 36 is generally disposed within the central bore 60 of the valve body 52. The valve body 52 further includes an axial opening 64 distal from the solenoid housing 50. The valve body 52 further includes a first spring seat 68 opposite the axial opening 64 and an end cap 70 defining a third spring seat proximate the axial opening 64. The valve body 52 further defines the fluid outlet 34.

As shown in FIG. 3, the valve body 52 includes an externally threaded portion 74, such that the valve body 52 may be threaded to a receiver. The valve body 52 further includes an armature receiving portion 76 that extends into the solenoid housing 50 and that defines a chamber for the magnetic armature 40. The magnetic armature 40 is slidably received within this chamber, and the plunger 80 is press-fit within a central opening in the magnetic armature 40 for engaging the shuttle valve 48. The control valve 22 further includes a permanent magnet 84 between the armature receiving portion 76 of the valve body 52 and the sidewall 54 of the solenoid housing 50. The magnet 84 generates an electromagnetic field that attracts the magnetic armature 40 and that opposes the electromagnetic field generated by the solenoid 41.

Referring now to FIG. 4, the control valve 22 includes a valve assembly comprising the spool valve 38 and the shuttle valve 48. The spool valve 38 is axially displaceable within the valve body 52. A first washer 86 is disposed between the first spring 42 and the shuttle valve 48. The first washer 86 may define a tunable damping orifice, or multiple tunable damping orifices. The second spring 44 is disposed between the shuttle valve 48 and a second washer 88 for opposing downward travel of the shuttle valve 48 relative to the spool valve 38. The third spring 46 is disposed between the second washer 88 and the end cap 70 for opposing downward travel of the spool valve 38. The spool valve 38 defines an operating port 92 and a fail-safe port 94. Both the operating port 92 and the fail-safe port 94 are disposed between the first washer 86 and the second washer 88. The shuttle valve 48 is concentrically received within the spool valve 38 between the first washer 86 and the second spring 44. The shuttle valve 48 is generally cup-shaped and defines a plurality of fluid apertures 98 extending axially therethrough.

In operation, the solenoid 41 generates an electromagnetic field that drives the magnetic armature 40 downward. In turn, the plunger 80 exerts an axial force on the shuttle valve 48. In the absence of a stronger countervailing force, the shuttle valve 48 is axially displaced in a direction opposite the solenoid 41, toward the valve inlet 32. The strength of the electromagnetic field generated by the solenoid 41 is directly proportional to the solenoid current.

Figure 5:
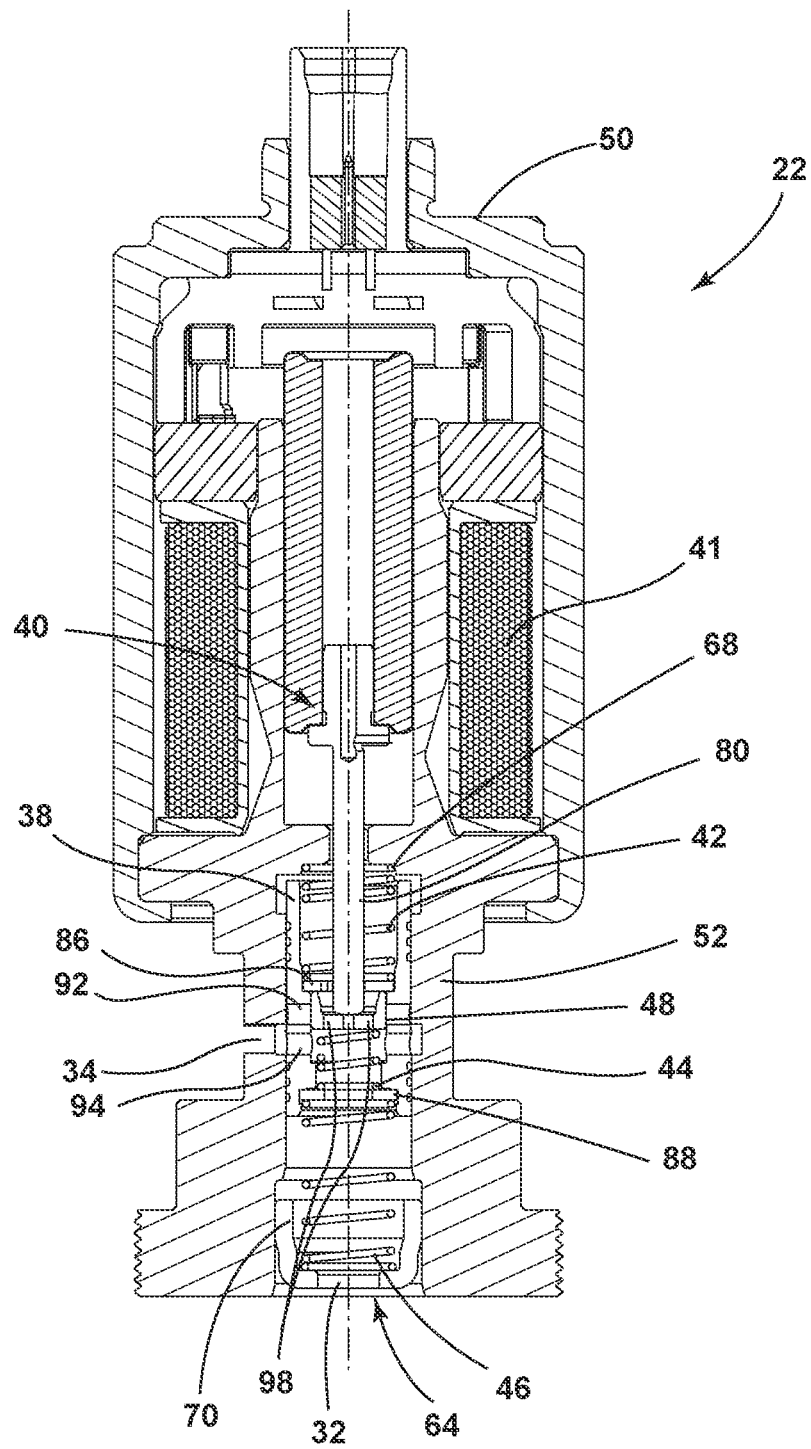
FIG. 5 is a cross-sectional view of the smart damping control valve in an open fail-safe position.

The smart damping control valve 22 is configured to rest in the closed fail-safe position in the absence of a solenoid current (i.e., at failure) and at a fluid pressure below a fail-safe opening pressure. The smart damping control valve 22 in the closed fail-safe position is depicted in FIG. 4. In the closed fail-safe position, the operating port 92 and the fail-safe port 94 are closed. The shuttle valve 48 is disposed within the spool valve 38 at a shuttle rest position, such that the shuttle valve 48 blocks the operating port 92. If fluid pressure at the inlet 32 is increased to or above the fail-safe opening pressure, for example 40 bar, the control valve 22 will transition into an open fail-safe position, shown in FIG. 5, by compressing the first spring 42 and thereby axially displacing the spool valve 38 in unison with the shuttle valve 48. In this position, the valve inlet 32 is in fluid communication with the valve outlet 34 via the fail-safe port 94. If fluid pressure at the valve inlet 32 decreases below the fail-safe opening pressure, the smart damping control valve 22 reverts to the closed fail-safe position, shown in FIG. 4, as the first spring 42 axially displaces the spool valve 38 and the shuttle valve 48 downward.

Figure 6:
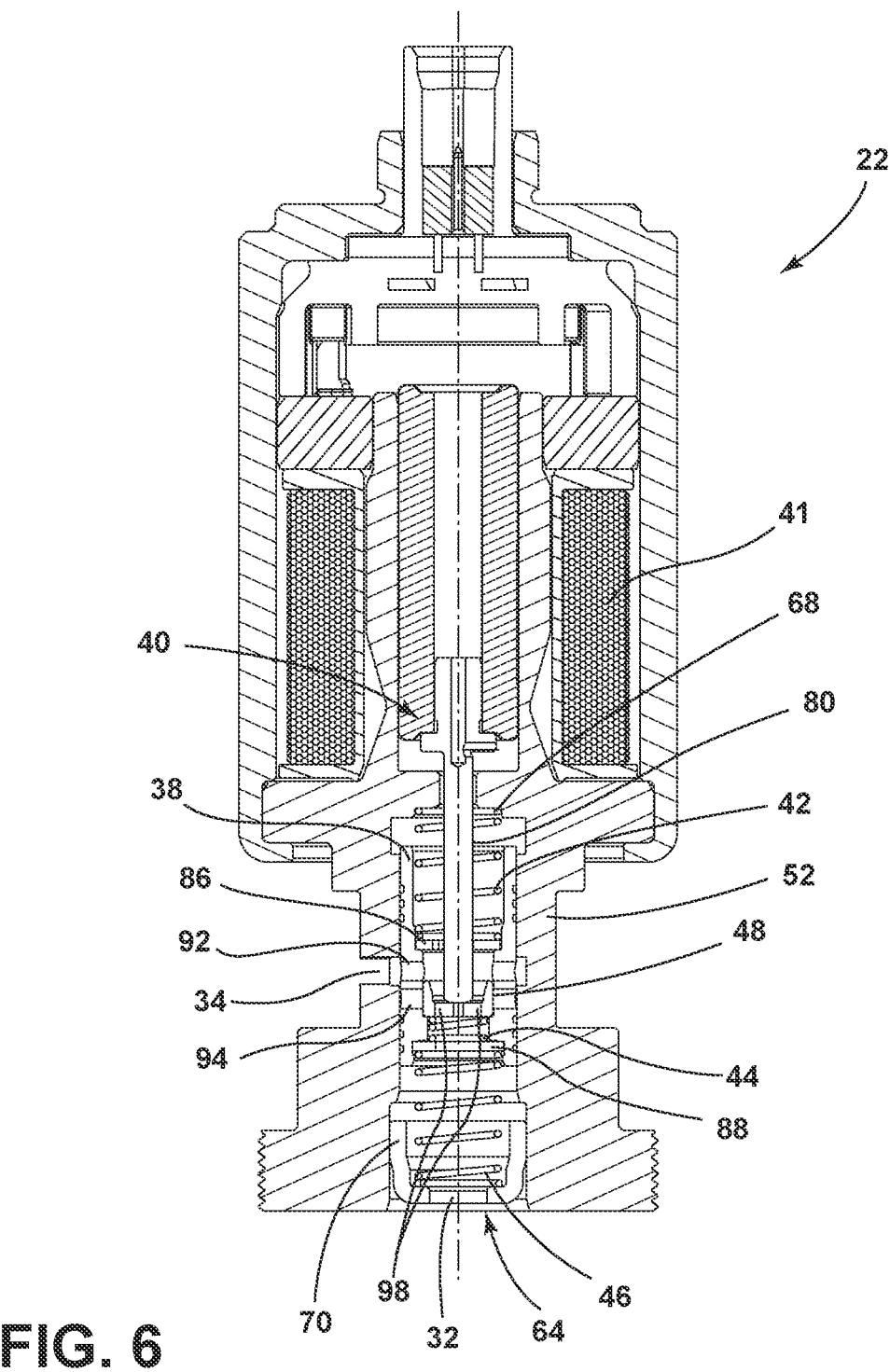
FIG. 6 is a cross-sectional view of the smart damping control valve in a minimum current position.

As depicted in FIG. 6, the smart damping control valve 22 is configured to open in a minimum current position. In the minimum current position, the plunger 80 travels axially to displace the shuttle valve 48 downward relative to the spool valve 38, compressing the second spring 44. In this position, the shuttle valve 48 no longer obstructs the operating port 92 of the shuttle valve 48, and the valve inlet 32 is in fluid communication with the valve outlet 34 via the fluid apertures 98 and the operating port 92. The valve opening pressure in this position is less than the fail-safe opening pressure, for example less than 10 bar, further optionally 2 bar.

Figure 7:
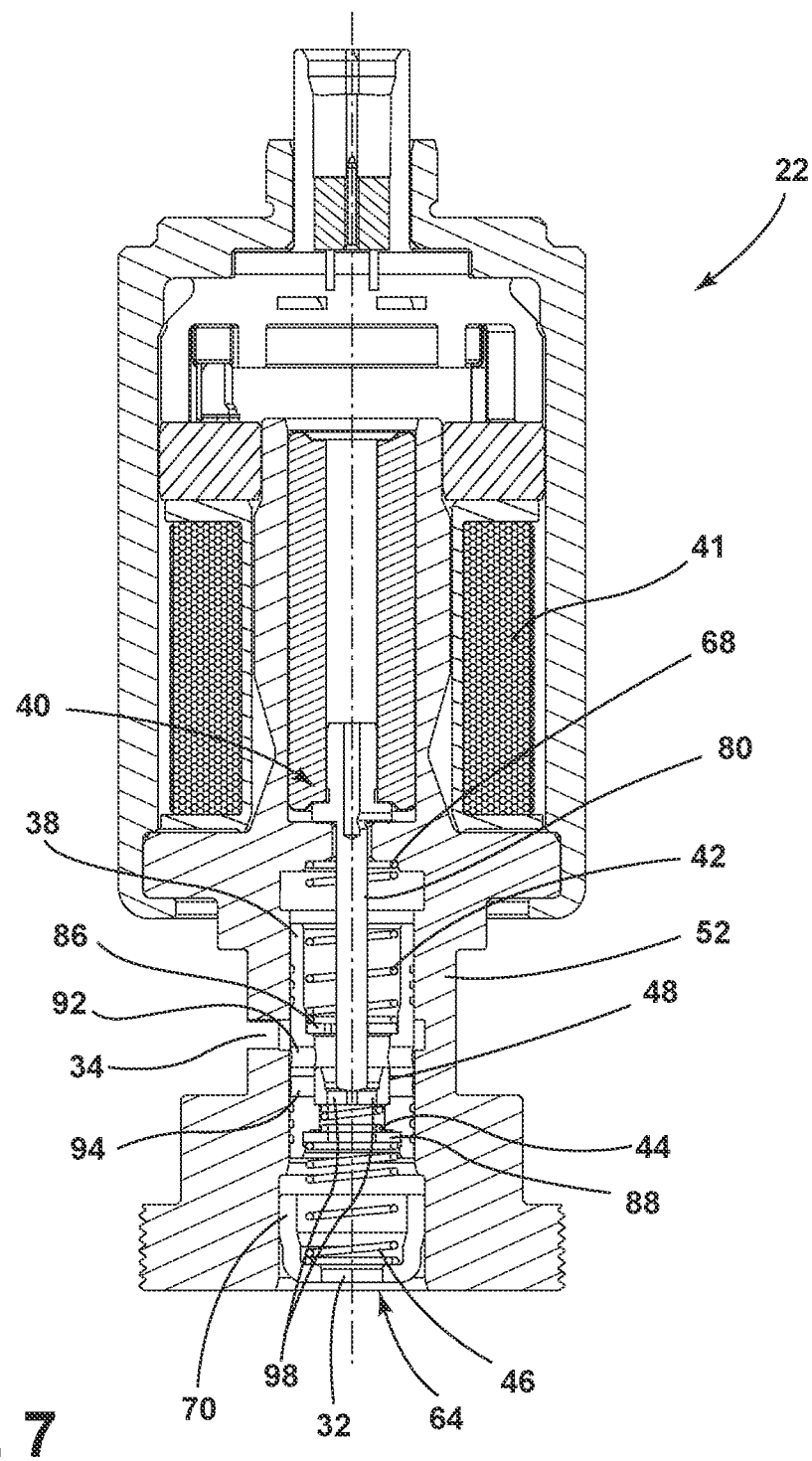
FIG. 7 is a cross-sectional view of the smart damping control valve in a maximum current position.

As depicted in FIG. 7, the smart damping control valve 22 is configured to open in a maximum current position. In the maximum current position, the plunger 80 travels axially to displace the spool valve 38, thereby compressing the third spring 46, the third spring having a greater spring constant than the second spring 44. In this position, the operating port 92 of the shuttle valve 48 is axially offset relative to the valve outlet 34, such that the valve outlet 34 is closed. When the fluid pressure at the valve inlet 32 exceeds a maximum current opening pressure, for example 80 bar, the fluid pressure displaces the valve assembly (i.e., the spool valve 38 and the shuttle valve 48) axially, against the force of the first spring 42 and against the electromagnetic force of the solenoid 41. The valve inlet 32 is in fluid communication with the valve outlet 34 via the fluid apertures 98 and the operating port 92. The valve opening pressure in this position is greater than the fail-safe opening pressure, for example 80 bar. If current ceases entirely, the control valve 22 will transition into the closed fail-safe position, and the second spring 44 and the third spring 46 will axially displaces the shuttle valve 48 and the magnetic armature 40 toward the solenoid 41. If current increases to the maximum current, the smart damping control valve 22 will again transition into the maximum current position as the solenoid 41 exerts a greater solenoid axial force that axially displaces the magnetic armature 40, shuttle valve 48, and spool valve 38 in a direction toward the opening of the valve cavity and away from the solenoid 41.

Figure 8:
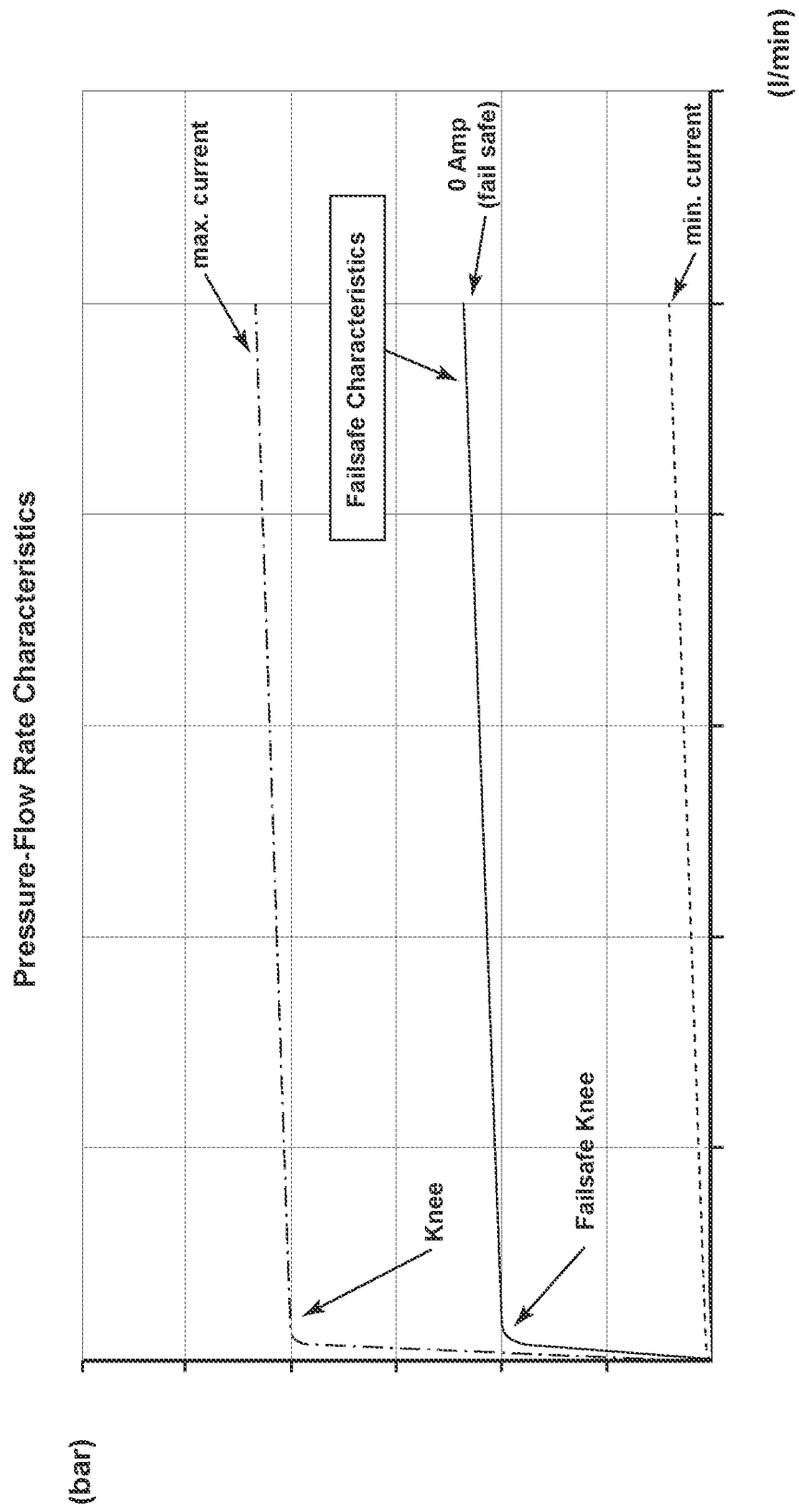
FIG. 8 is a graphical depiction of the volumetric flow rate at different pressures for minimum current, maximum current, and zero current (failure).

The pressure-flow rate characteristics of an exemplary embodiment of the damping control valve in the minimum current position, the fail-safe position, and the maximum current position are depicted in FIG. 8. In both the maximum current position and the fail-safe position of the damping control valve, the smart damping control valve 22 demonstrates a low-gain condition where a unit of change in fluid pressure will result in less change in volumetric flow rate relative to a high-gain condition where a unit of change in fluid pressure will result in more change in volumetric flow rate relative to the low-gain condition. Around the respective opening pressure for the maximum current position and the fail-safe position, the damping control valve transitions from the low-gain condition to the high-gain condition, or the high-gain condition transitions to the low-gain condition, depending on whether the fluid pressure is increasing or decreasing toward the opening pressure, respectively.

The above description is that of current embodiments of the invention. Various alterations and changes can be made without departing from the spirit and broader aspects of the invention as defined in the appended claims, which are to be interpreted in accordance with the principles of patent law including the doctrine of equivalents. This disclosure is presented for illustrative purposes and should not be interpreted as an exhaustive description of all embodiments of the invention or to limit the scope of the claims to the specific elements illustrated or described in connection with these embodiments. For example, and without limitation, any individual element(s) of the described invention may be replaced by alternative elements that provide substantially similar functionality or otherwise provide adequate operation. This includes, for example, presently known alternative elements, such as those that might be currently known to one skilled in the art, and alternative elements that may be developed in the future, such as those that one skilled in the art might, upon development, recognize as an alternative. Further, the disclosed embodiments include a plurality of features that are described in concert and that might cooperatively provide a collection of benefits. The present invention is not limited to only those embodiments that include all of these features or that provide all of the stated benefits, except to the extent otherwise expressly set forth in the issued claims. Any reference to claim elements in the singular, for example, using the articles "a," "an," "the" or "said," is not to be construed as limiting the element to the singular.

The invention claimed is:

1. A control valve for a shock absorber or a suspension system, the control valve comprising:
    a valve housing defining a valve inlet and a valve outlet, wherein the valve inlet and the valve outlet are connected by a fluid passage;
    a valve assembly within the fluid passage, the valve assembly comprising a shuttle valve concentrically positioned with respect to a spool valve, the shuttle valve being axially movable relative to the spool valve to obstruct either of a fail-safe port or an operating port of the spool valve, the spool valve being axially movable relative to the valve housing to selectively obstruct the valve outlet;
    a solenoid including a magnetic armature that engages the shuttle valve via a plunger to drive axial movement of the shuttle valve and ultimately the spool valve, the magnetic armature being axially displaceable at a plurality of positions and being adapted to vary an opening pressure of the valve assembly;
    wherein, in response to a first electrical current to the solenoid, the shuttle valve is displaced relative to the spool valve, such that the valve assembly defines a first opening pressure;
    wherein, in response to a second electrical current to the solenoid, the spool valve is displaced relative to the valve housing, such that the valve assembly defines a second opening pressure greater than the first opening pressure; and
    wherein, in the absence of an electrical current to the solenoid, the valve assembly defines a fail-safe opening pressure between the first opening pressure and the second opening pressure.

2. The control valve of claim 1, wherein the spool valve includes a first outer diameter along a first portion thereof and includes a second outer diameter along a second portion thereof, the first outer diameter being less than the second outer diameter.

3. The control valve of claim 1, wherein the fail-safe port and the operating port extend radially through a sidewall of the spool valve and are axially offset from each other.

4. The control valve of claim 1, wherein the shuttle valve is cup-shaped and defines a plurality of flow passages extending axially therethrough.

5. The control valve of claim 1, further including a first compression spring that is positioned to bias the spool valve in a first direction away from the solenoid.

6. The control valve of claim 5, further including a second compression spring to bias the shuttle valve in a second direction, opposite of the first direction.

7. A control valve for a shock absorber or a suspension system, the control valve comprising:
    a valve housing defining a valve inlet and a valve outlet, wherein the valve inlet and the valve outlet are connected by a fluid passage;
    a valve assembly within the fluid passage, the valve assembly comprising a shuttle valve concentrically positioned with respect to a spool valve, the shuttle valve being axially movable relative to the spool valve to obstruct either of a fail-safe port or an operating port of the spool valve;
    a solenoid including a magnetic armature, the magnetic armature being axially displaceable at a plurality of positions and being adapted to vary an opening pressure of the valve assembly;
    wherein, in response to a first electrical current to the solenoid, the valve assembly defines a first opening pressure;
    wherein, in response to a second electrical current to the solenoid, the valve assembly defines a second opening pressure greater than the first opening pressure; and
    wherein, in the absence of an electrical current to the solenoid, the valve assembly defines a fail-safe opening pressure between the first opening pressure and the second opening pressure,
    the control valve further including:
        a first compression spring that is positioned to bias the spool valve in a first direction away from the solenoid,
        a second compression spring to bias the shuttle valve in a second direction, opposite of the first direction, and
        a third compression spring to bias the spool valve in the second direction, opposite of the first direction.

8. The control valve of claim 7, wherein the second compression spring includes a spring constant that is greater than or less than a spring constant of the third compression spring.

9. The control valve of claim 8, wherein the second compression spring and the third compression spring are disposed in series within the fluid passage.

10. The control valve of claim 1, wherein the valve inlet is defined through an axial opening in the valve housing and the valve outlet is defined through a radial opening in the valve housing.

11. The control valve of claim 1, wherein in response to pressure at the valve inlet exceeding the opening pressure of the valve assembly, the valve inlet is in fluid communication with the valve outlet for allowing hydraulic fluid to move therethrough.

12. A control valve for a shock absorber or a suspension system, the control valve comprising:
- a valve housing defining a valve inlet and a valve outlet, wherein the valve inlet and the valve outlet are connected by a fluid passage;
- a valve assembly within the fluid passage and including a shuttle valve and a spool valve, the spool valve defining a fail-safe port and an operating port, each of the fail-safe port and the operating port extending radially from a central through-bore of the spool valve, the shuttle valve defining a plurality of flow passages extending axially therethrough, the spool valve being axially movable relative to the valve housing to selectively obstruct the valve outlet, the shuttle valve being axially moveable within the central through-bore of the spool valve; and
- a solenoid including a magnetic armature that engages the shuttle valve via a plunger to drive axial movement of the shuttle valve and ultimately the spool valve, the magnetic armature being axially displaceable at a plurality of positions for varying an opening pressure of the valve assembly, wherein the valve assembly provides a plurality of opening pressures corresponding to each of the plurality of positions of the magnetic armature, wherein:
  - in response to a first electrical current to the solenoid, the shuttle valve is displaced relative to the spool valve, such that the valve assembly defines a first opening pressure;
  - in response to a second electrical current to the solenoid, the spool valve is displaced relative to the valve housing, such that the valve assembly defines a second opening pressure greater than the first opening pressure; and
  - in the absence of an electrical current to the solenoid, the valve assembly defines a fail-safe opening pressure between the first opening pressure and the second opening pressure.

13. The control valve of claim 12, wherein in response to pressure at the valve inlet exceeding the opening pressure of the valve assembly, the valve inlet is in fluid communication with the valve outlet for allowing hydraulic fluid to move therethrough.

14. The control valve of claim 12, wherein the valve inlet is defined through an axial opening in the valve housing and the valve outlet is defined through a radial opening in the valve housing.

15. The control valve of claim 12, further including a first compression spring that is positioned to bias the spool valve in a first direction away from the solenoid.

16. The control valve of claim 15, further including a second compression spring to bias the shuttle valve in a second direction, opposite of the first direction.

17. A control valve for a shock absorber or a suspension system, the control valve comprising:
- a valve housing defining a valve inlet and a valve outlet, wherein the valve inlet and the valve outlet are connected by a fluid passage;
- a valve assembly within the fluid passage and including a shuttle valve and a spool valve, the spool valve defining a fail-safe port and an operating port, each of the fail-safe port and the operating port extending radially from a central through-bore of the spool valve, the shuttle valve defining a plurality of flow passages extending axially therethrough, the shuttle valve being axially moveable within the central through-bore of the spool valve; and
- a solenoid including a magnetic armature, the magnetic armature being axially displaceable at a plurality of positions for varying an opening pressure of the valve assembly, wherein the valve assembly provides a plurality of opening pressures corresponding to each of the plurality of positions of the magnetic armature the control valve further including:
- a first compression spring that is positioned to bias the spool valve in a first direction away from the solenoid,
- a second compression spring to bias the shuttle valve in a second direction, opposite of the first direction, and
- a third compression spring to bias the spool valve in the second direction, opposite of the first direction.

18. The control valve of claim 17, wherein the second compression spring includes a spring constant that is greater than or less than a spring constant of the third spring.

19. The control valve of claim 18, wherein the second compression spring and the third compression spring are disposed in series within the fluid passage.

\* \* \* \* \*